United States Patent
Kaushik et al.

(10) Patent No.: US 9,515,994 B2
(45) Date of Patent: Dec. 6, 2016

(54) KEYWORD ORDERED STORAGE, SEARCH AND RETRIEVAL ON ENCRYPTED DATA FOR MULTIUSER SCENARIO

(71) Applicant: Infosys Limited, Bangalore (IN)

(72) Inventors: Kulvaibhav Kaushik, Jaipur (IN); Vijayaraghavan Varadharajan, Salem (IN); Rajarathnam Nallusamy, Chitrapatti (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/614,241

(22) Filed: Feb. 4, 2015

(65) Prior Publication Data
US 2015/0229611 A1   Aug. 13, 2015

(30) Foreign Application Priority Data
Feb. 13, 2014  (IN) .............................. 681/CHE/2014

(51) Int. Cl.
| | |
|---|---|
| *H04L 9/00* | (2006.01) |
| *H04L 9/32* | (2006.01) |
| *H04L 29/06* | (2006.01) |
| *H04L 9/08* | (2006.01) |
| *H04L 9/30* | (2006.01) |

(52) U.S. Cl.
CPC ......... *H04L 63/0281* (2013.01); *H04L 9/0825* (2013.01); *H04L 9/30* (2013.01); *H04L 63/0428* (2013.01); *H04L 63/0435* (2013.01); *H04L 63/0478* (2013.01); *H04L 2209/76* (2013.01)

(58) Field of Classification Search
CPC ..... H04L 9/08; H04L 9/0816; H04L 9/0819; H04L 9/0822; H04L 9/0838; H04L 9/0861; H04L 9/085; H04L 63/0281
USPC .................. 380/29, 44, 277, 278, 281, 284; 713/162, 189
See application file for complete search history.

(56) References Cited

U.S. PATENT DOCUMENTS

| | | | |
|---|---|---|---|
| 6,751,613 B1 | 6/2004 | Lee et al. | |
| 7,634,087 B2 | 12/2009 | Boneh et al. | |
| 7,921,450 B1* | 4/2011 | Vainstein ............ | G06F 21/6209 380/285 |
| 8,130,964 B2 | 3/2012 | Boneh et al. | |
| 8,213,609 B2* | 7/2012 | Kusakawa ............ | H04L 9/3073 380/29 |
| 8,229,112 B2* | 7/2012 | Fuhr ........................ | H04L 9/30 380/255 |

(Continued)

FOREIGN PATENT DOCUMENTS

EP       364180       4/1990

OTHER PUBLICATIONS

Golle et al., "Applied Cryptography and Network Security," Second International Conference, ACNS 2004, Yellow Mountain, China, Jun. 8-11, 2004, Proceedings, pp. 31-45.

(Continued)

*Primary Examiner* — Hosuk Song
(74) *Attorney, Agent, or Firm* — Klarquist Sparkman, LLP

(57) ABSTRACT

A method and system for a multi-user searchable encryption system over ordered keywords is disclosed. The system includes a key generation server which issues a primary key to a user terminal device and a secondary key to a proxy server. A trapdoor is sent by the user terminal and received by the proxy server. The trapdoor is encrypted at the proxy server. The proxy server receives cypher text from the user terminal and sends the cypher text to the database server. A search keyword inputted by the user at the user terminal is used to perform a lookup in encrypted data.

19 Claims, 2 Drawing Sheets

(56) References Cited

U.S. PATENT DOCUMENTS

| | | | |
|---|---|---|---|
| 8,380,720 | B2 | 2/2013 | Chang et al. |
| 8,615,668 | B2 * | 12/2013 | Matsuda ............. G06F 21/6245 713/189 |
| 8,812,867 | B2 | 8/2014 | Jho et al. |
| 2011/0145594 | A1 | 6/2011 | Jho et al. |
| 2013/0046974 | A1 | 2/2013 | Kamara et al. |
| 2014/0075202 | A1 | 3/2014 | Varadharajan et al. |
| 2014/0122900 | A1 | 5/2014 | Kaushik et al. |

OTHER PUBLICATIONS

Cathalo et al., "One-Time Trapdoor One-Way Functions," Université catholique de Louvain, Place de Levant 3, 1348 Louvain-laNeuve, Belgium, http://perso.uclovain.be/christophe.petit/files/ISC2010short.pdf, visited Feb. 24, 2012, 15 pages.

Chen et al., "Efficient generic on-line/off-line signatures without key exposure," Applied Cryptography and Network Security, Proceeding 5$^{th}$ International Conference, ACNS 2007, 6 pages.

Xu et al., "Secure Cloud Storage with Encrypted Data using File Based Authentication," International Association for Cryptologic Research, http://eprint.iacr.org/2011/538.pdf, visited Feb. 24, 2012, 13 pages.

Boneh et al., "Identity-Based Encryption from the Weil Pairing," SIAM Journal of Computing, vol. 32, No. 3, pp. 587-615, 2003.

Asija et al., "Data Model to Enhance the Security and Privacy of Healthcare Data," 2014 IEEE Global Humanitarian Technology Conference—South Asia Satellite (GHTC-SAS), pp. 237-244, Sep. 26-27, 2014, 8 pages.

Boneh et al., "Public key encryption with keyword search," Cachin C., Camenisch J.L. (eds), EUROCRYPT 2004, LNCS, vol. 3027, pp. 504-522, spinger-Verlag, 2004, 15 pages.

Hwang et al., "Public Key Encryption with Conjunctive Keyword Search and Its Extension to a Multi-User System," Conference: Pairing-Based Cyrptography, Tokyo, Japan, pp. 2-22, Springer-Verlag, 2007, 21 pages.

Kaushik et al., "Multi-user Attribute Based Searchable Encryption," 2013 IEEE 14$^{th}$ International Conference on Mobile Data Management, pp. 200-205, 2013, 6 pages.

Makherjec et al., "A Context Based Cryptographic Content Sharing System," 2013 International Conference on Advances in Computing, Communications and Informatics (ICACCI), pp. 477-482, 2013, 6 pages.

Nallusamy et al., "Securing Wireless Sensor Network Based Solutions," 2012 World Congress on Information and Communication Technologies, pp. 583-589, 2012, 7 pages.

Nallusamy et al., "Strong Authentication for Secure Content Access in Converged Networks," 2009 IEEE 3$^{rd}$ International Symposium on Advanced Networks and Telecommunications Systems (ANTS), New Delhi, Dec. 2009, 3 pages.

Park et al., "Public Key Encryption with Conjunctive Field Keyword Search," Proceedings of WISA '04, LNCS vol. 3325, pp. 73-86, Springer-Verlag, 2004, 14 pages.

Varadharajan et al., "Anonymous Searchable Encryption Scheme for Multi-User Database," 2013 IEEE International Conference on Cloud Engineering, pp. 225-232, 8 pages.

Vashistha et al., "Watermarking Video Content Using Visual Cryptography and Scene Averaged Image," 2010 IEEE International Conference on Multimedia and Expo (ICME), pp. 1641-1646, Jul. 2010, 6 pages.

* cited by examiner

KEYWORD ORDERED STORAGE, SEARCH AND RETRIEVAL ON ENCRYPTED DATA FOR MULTIUSER SCENARIO

FIELD

The field relates generally a multi-user searchable encryption system. In particular, the field relates to a method and a system for a multi-user searchable encryption system over ordered keywords.

BACKGROUND

Nowadays, the advancement in Information Technology based solutions have made data growth inexorable in nearly all the sectors. A large share of an organization's expenditure is incurred on data storage and maintenance. Storage as a service provided by third party remote servers offer an alternative to organizations thereby reducing the cost incurred on data storage and maintenance. The storage as a service provided by third party remote server also provides efficient data management. Remote data storage and third party involvement makes data security and integrity highly significant. The tradeoff between data encryption and search over an encrypted data needs to be addressed. Leading web service enterprises have come up with cloud computing solutions. The quality of a provider is evaluated on parameters such as, but not limited to, data security and integration, efficient data search, and system adaptability to environment change.

Data security requires an efficient data encryption, use of secure channels for data transmission and server security. In case data security is compromised cypher text should not reveal any information. An encryption of data should be carried out so that no inferences may be made on data pattern by a curious server. Efficient data search should provide valid results in minimum period of time. Searching over plaintext is easy and fast however it provides cloud with an access to the data. Further, system must be adaptable to changes at user end.

Accordingly, there is a need for a method and a system for a multi-user searchable encryption system over ordered keywords.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
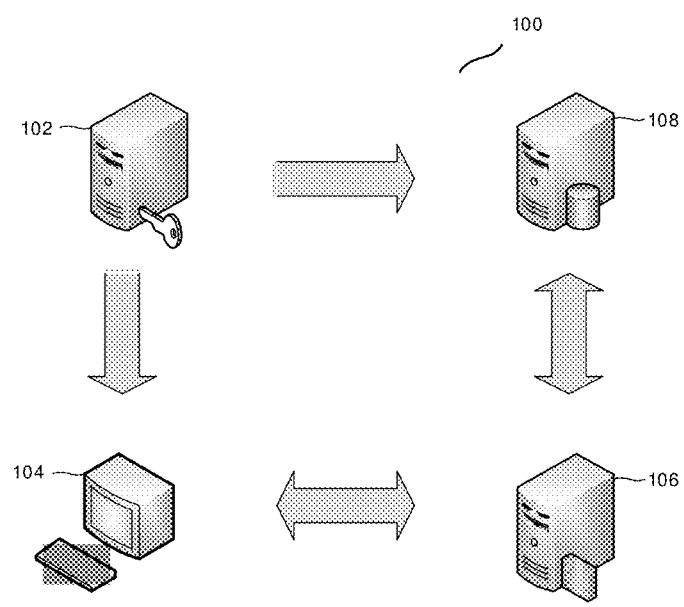
FIG. 1 illustrates a multi-user searchable encryption system in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to method and system for a multi-user searchable encryption system over ordered keywords. Accordingly, the system components, apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide methods and systems for a multi-user searchable encryption system over ordered keywords. The system includes a key generation server which issues a primary key to a user terminal device and a secondary key to a proxy server. A trapdoor is sent by the user terminal and received by the proxy server. The trapdoor is encrypted at the proxy server. The proxy server receives cypher text from the user terminal and sends the cypher text to the database server. A search keyword inputted by the user at the user terminal is used to perform a lookup in encrypted data.

FIG. 1 illustrates a multi-user searchable encryption system 100 in accordance with an embodiment of the invention. As shown in FIG. 1, multi-user searchable encryption system 100 includes a key generation server 102, a user terminal 104, a proxy server 106, and a database server 108. Key generation server 102 generates system parameters, a primary key, and a secondary key. User terminal 104 receives the primary key from key generation server 102. Proxy server 106 receives the secondary key from key generation server 102. A user, at user terminal 104, encrypts data to obtain cypher text. In an embodiment, the data may be encrypted using a symmetric key to obtain the cypher text. Further, at user terminal 104, the symmetric key is encrypted to obtain encrypted symmetric key. In an embodiment, the symmetric key may be encrypted using primary key to obtain the encrypted symmetric key. In addition, at user terminal 104, keyword is encrypted to obtain the encrypted keyword. In an embodiment, the keyword is encrypted using primary key to obtain encrypted keyword.

Proxy server 106 maintains a table of secondary keys. Further, proxy server 106 receives, from user terminal device 104, the cypher text, the encrypted keyword, and the encrypted symmetric key. Upon receiving the encrypted keyword and the encrypted symmetric key, proxy server 106, re-encrypts the encrypted keyword and the encrypted symmetric key using the secondary key. Thereafter, proxy server 106 sends the cypher text and the re-encrypted symmetric key to database server 108. Upon receiving the cypher text and the re-encrypted symmetric key, database server 108 stores the cypher text and the re-encrypted symmetric key at a location address and sends the location address of the cypher text to proxy server 106. Proxy server 106 maintains a re-encrypted keyword table to store re-encrypted keywords. Proxy server 106 also maintains a table to store location address of data residing at database server 108.

In an embodiment, the user of user terminal 104 inputs a search keyword in order to search for encrypted data. In such a scenario, at user terminal 104, a trapdoor is generated using the primary key for the search keyword inputted by the user. The trapdoor is then sent to proxy server 106. Further, at user terminal 104, a decryption parameter is generated using the primary key. The decryption parameter is then sent to proxy server 106.

Upon receiving the trapdoor, at proxy server 106, the trapdoor is encrypted using the secondary key. Thereafter, proxy server 106 performs a lookup for results corresponding to the search keyword inputted by the user at the user terminal 104. Proxy server 106 performs a lookup for results by identifying location of data at database server 108 using the re-encrypted keyword table and the table which stores location address of data residing at database server 108. In case location of data is identified at database server 108, proxy server 106 retrieves the cypher text and the re-encrypted symmetric key from database server 108.

Further, proxy server 106 generates a decryption attribute using the decryption parameter, the secondary key, and the re-encrypted symmetric key. Thereafter, proxy server 106 sends the decryption attribute and the cypher text to user terminal 104. Upon receiving the decryption attribute and the cypher text, user terminal 104 generates decryption keys using the decryption attribute, the primary key and the decryption parameter. Thereafter, user terminal 104 decrypts the cypher text using the decryption keys and symmetric decryption.

Figure 2:
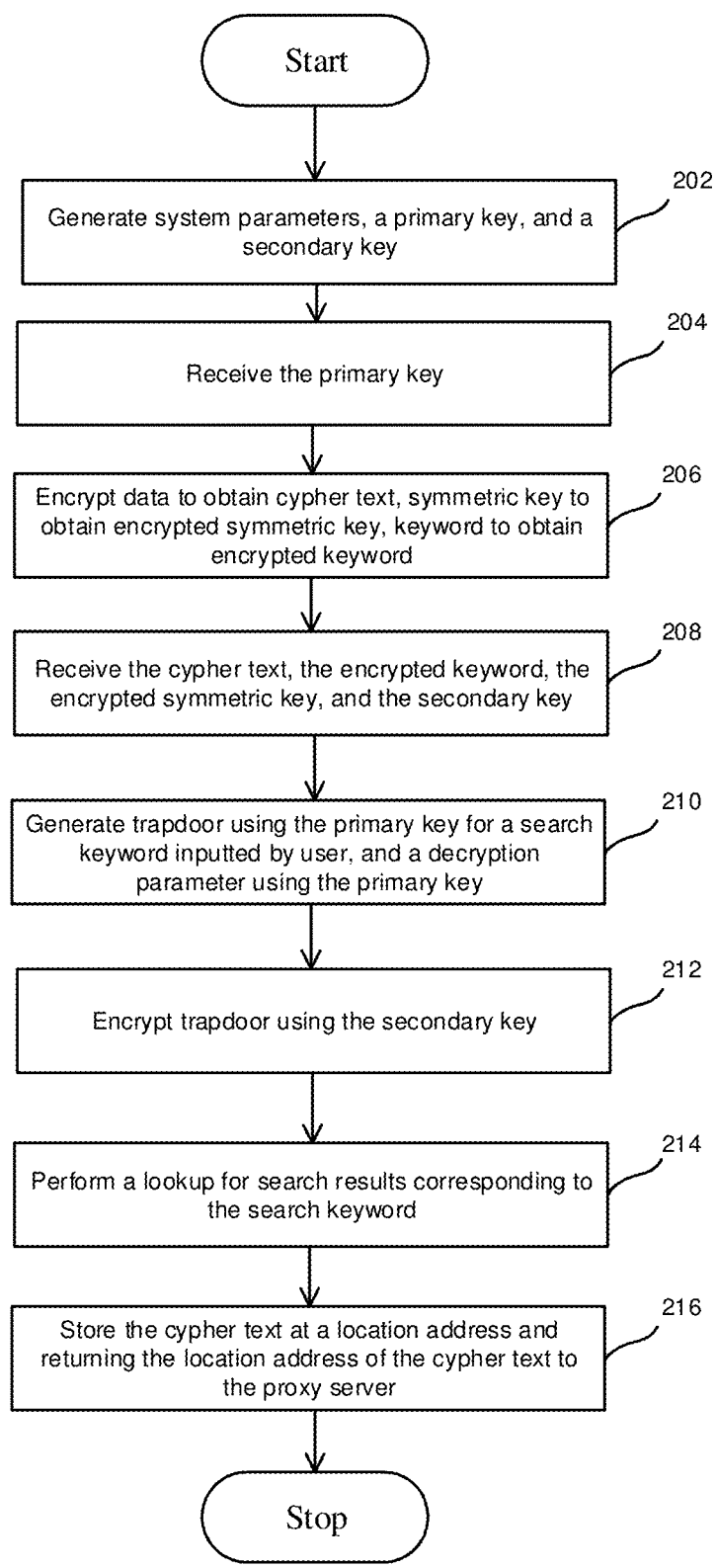
FIG. 2 illustrates a flowchart of a method of multi-user searchable encryption in accordance with an embodiment of the invention.

FIG. 2 illustrates a flowchart of a method of multi-user searchable encryption in accordance with an embodiment of the invention. As shown in FIG. 2, at step 202, system parameters, a primary key, and a secondary key are generated at a key generation server 102. At step 204, the primary key is received by a user terminal 104. The secondary key is received by proxy server 106. At step 206, data is encrypted by a user at user terminal 104 to obtain cypher text. In an embodiment, the data may be encrypted using a symmetric key to obtain the cypher text. Further, at step 206, the symmetric key is encrypted to obtain encrypted symmetric key at user terminal 104. In an embodiment, the symmetric key may be encrypted using primary key to obtain the encrypted symmetric key. In addition, at step 206, keyword is encrypted to obtain the encrypted keyword user terminal 104. In an embodiment, the keyword is encrypted using primary key to obtain encrypted keyword.

A table of secondary keys is maintained at proxy server 106. Further, the cypher text, the encrypted keyword, and the encrypted symmetric key are received by proxy server 106 from user terminal device 104 at step 208. Upon receiving the encrypted keyword and the encrypted symmetric key, the encrypted keyword and the encrypted symmetric key are re-encrypted using the secondary key at proxy server 106. Thereafter, the cypher text and the re-encrypted symmetric key are sent by proxy server 106 to database server 108. Upon receiving the cypher text and the re-encrypted symmetric key, the cypher text and the re-encrypted symmetric key at a location address are stored at database server 108 and the location address of the cypher text is sent to proxy server 106. A re-encrypted keyword table is maintained at proxy server 106 to store re-encrypted keywords. Further, a table to store location address of data residing at database server 108 is maintained at proxy server 106.

In an embodiment, the user of user terminal 104 inputs a search keyword in order to search for encrypted data. In such a scenario, at step 210, a trapdoor is generated at user terminal 104 using the primary key for the search keyword inputted by the user. The trapdoor is then sent to proxy server 106. Further, at step 210, a decryption parameter is generated at user terminal 104 using the primary key. The decryption parameter is then sent to proxy server 106.

Upon receiving the trapdoor, at step 212, the trapdoor is encrypted at proxy server 106 using the secondary key. Thereafter, a lookup for results corresponding to the search keyword inputted by the user is performed by proxy server 106 at the user terminal 104 at step 214. The lookup is performed by proxy server 106 for results by identifying location of data at database server 108 using the re-encrypted keyword table and the table which stores location address of data residing at database server 108. In case location of data is identified at database server 108, proxy server 106 retrieves the cypher text and the re-encrypted symmetric key from database server 108.

Further, a decryption attribute is generated at proxy server 106 using the decryption parameter, the secondary key, and the re-encrypted symmetric key. Thereafter, the decryption attribute and the cypher text is sent by proxy server 106 sends to user terminal 104. Upon receiving the decryption attribute and the cypher text, decryption keys are generated by user terminal 104 using the decryption attribute, the primary key and the decryption parameter. Thereafter, the cypher text is decrypted at user terminal 104 using the decryption keys and symmetric decryption.

The method and system for multi-user searchable encryption is further explained as follows:

The key generator generates system parameters based on security parameter k. The key generator returns cyclic group $G_1$, $G_2$ and $G_3$ of prime order q with admissible bilinear pairing ê: $G_1 \times G_1 \rightarrow G_2$ and $ê'$: $G_2 \times G_2 \rightarrow G_3$. Here, P is a generator for the group $G_1$. It also generates a random element £∈Z/qZ, secret to the key generator. A hash function defined as H:$\{0,1\}^* \rightarrow \{0,1\}^*$.

The key generator then selects a random number $s_i$ for every user. The key generator also generates a random element $K_i$. It generates a user key for user i as $$UK_i = \left\{ \frac{t \cdot P}{s_i}, K_i^{1/s_i}, K_i \right\}$$

The user key is then sent to user i. The key generator also generates a server key $SK_i$ corresponding to user i and send the same to the server.

$$SK_i = \{s_i\}$$

Consider a scenario in which the user wants to save data item m. The user associates data item m with a set of keywords KW=$\{W_1, W_2 \ldots W_n\}$. The user generates a random number y and encrypts the data using key $K_i^y$ using symmetric encryption. The user encrypts the key as $$K_i' = K_i^{y/s_i} \cdot ê\left(P, \frac{t \cdot P}{s_i}\right)$$

and the keywords as $$W'_i = \hat{e}\left(H(W_i) \cdot P, \frac{t \cdot P}{s_i}\right),$$

where l∈[1,n].

The user sends the encrypted key and encrypted keywords to proxy server $\{Enc_{K_j^y}^{SYM}(m), K'_i, W'_1, W'_2, \ldots W'_n\}$ Proxy server re-encrypts the key as $$K_i^s = (K'_i)^{s_i}$$
$$= \left(K_i^{y/s_i} \cdot \hat{e}\left(P, \frac{t \cdot P}{s_i}\right)\right)^{s_i}$$
$$= K_i^y \cdot \hat{e}(P, t \cdot P)$$

Proxy server re-encrypts the keywords as $$W''_i = (W'_i)^{s_i}$$
$$= \left(\hat{e}\left(H(W_i) \cdot P, \frac{t \cdot P}{s_i}\right)\right)^{s_i}$$
$$= \hat{e}\left(H(W_i) \cdot P, \frac{t \cdot P}{s_i}\right)^{s_i}$$
$$= \hat{e}(H(W_i) \cdot P, t \cdot P)$$

$$W_i^* = \hat{e}(W''_i, W''_i)$$

Further, proxy server generates a random number x, and sends the same to server $\{Enc_{K_j^y}^{SYM}(m), K_i^*, x \cdot P\}$ The server saves the encryption $\{Enc_{K_j^y}^{SYM}(m), K_i^*\}$ at a location $f_l$, and returns to proxy server $\{f'_l = Enc_{xb \cdot P}^{SYM}(f_l), b \cdot P\}$ Where, b is a random number generated by server.

Using the value of x and b·P, proxy computes xb·P and retrieves $f_l = Dec_{xb \cdot P}^{SYM}(f'_l)$ Proxy server maintains a lookup table A and a lookup table B. It checks whether the keyword entry already exists in table A.

TABLE 1

Table A

| Keyword Encrypted | Encryption Position in Table B |
|---|---|
|  |  |
|  |  |
|  |  |

TABLE 2

Table B

| Position | Encrypted file address | Encryption Position in Table B |
|---|---|---|
|  |  |  |
|  |  |  |

Case I: If the entry doesn't exist in table A

Proxy saves in A: $\{W_l^*, Enc_{W_l''}^{SYM}(b_l)\}$

Where $b_z$ is an empty location in the table B. At position $b_l$ in B, it saves $\{b_l, Enc_{W'''_l}^{SYM}(f_l), Enc_{W'''_l}^{SYM}(b_z)\}$ where $b_z$ is null as only one data file exists for the keyword.

Case II: If the entry exists in table A

It retrieves $b_l$ from A: $\{W_l^*, Enc_{W'''_l}^{SYM}(b_z)\}$. It saves in table B$\{b_l, Enc_{W'''_l}^{SYM}(f_l), Enc_{W'''_l}^{SYM}(b_l)\}$ where $b_l^*$ is an empty location in table B and modifies the table A by saving for position $W_1^*$ $\{W_1^*, Enc_{W'''_l}^{SYM}(b_l^*)\}$.

Consider a scenario in which user j performs a search over a cloud network for keyword $W_1$. Proxy server generates a random number v and sends the same to user v·p where it acts as a session key. The session key would be useful for the session and would be lost on session expiration. Further, user sends to proxy server:

$$Qry_j = \hat{e}\left(H(W_1) \cdot v \cdot P, \frac{t \cdot P}{s_j}\right),$$

Proxy server translates the query as:

$$Qry'_j = (Qry_j)^{s_j/v}$$
$$= \hat{e}\left(H(W_1) \cdot v \cdot P, \frac{t \cdot P}{s_j}\right)^{s_j/v}$$
$$= \hat{e}(H(W_i) \cdot P, t \cdot P).$$

Here, every query for same keyword by a particular user will be different and no learning may be made based on data sniffing from channel.

Proxy computes $Qry_j^* = e'(Qry_j', Qry_j')$

It checks table A for $Qry_j^*$:

If no matching is found, the keyword being search doesn't exist.

If a matching is found, the corresponding value $b_1$ is retrieved as $b_1 = Enc_{Qry'_j}^{SYM}$(Search result from table A)

The proxy server performs a lookup for the position $b_1$ in table B and retrieves the corresponding address for the file saved at server using $Qry'_j$. The proxy server also gets the next address in B where the next file is saved. Upon retrieving the address for different files, the proxy server retrieves a corresponding entry from database server.

User j, sends to proxy server along with the search query, $$K'_j = K_j^{a/s_j} \cdot \hat{e}\left(P, \frac{t \cdot P}{s_j}\right)$$

where α is a random number. The proxy server re-encrypts $K'_j$ as $$K''_j = (K'_j)^{s_j}$$
$$= \left(K_j^{\alpha/s_j} \cdot \hat{e}\left(P, \frac{t \cdot P}{s_j}\right)\right)^{s_j}$$
$$= K_j^{\alpha} \cdot \hat{e}(P, t \cdot P)$$

Proxy server returns to the user:

$$K'''_j = \frac{K_i^y}{K''_j}$$
$$= \frac{K_i^y \cdot \hat{e}(P, t \cdot P)}{K_i^{\alpha} \cdot \hat{e}(P, t \cdot P)}$$
$$= \frac{K_i^y}{K_j^{\alpha}}$$

User computes the decryption key $$K^*_j = \frac{K_i^y}{K_j^{\alpha}} \cdot K_j^{\alpha}$$
$$= K_i^y.$$

The user can decrypt the data as $m=\text{Dec}_{K^*_j}^{SYM}$(encrypted data)

The method and system for multi-user searchable encryption system is further explained using the following example. The method and system disclosed provides a faster and secure way for data storage, search and retrieval. In a scenario of a healthcare domain, consider an e-healthcare application where medical data of various patients is stored online. The medical data is stored at a remote data store such as on a cloud. The data stored at the cloud if compromised may lead to heavy losses. In an instance, the transmission of medical data from the user to the cloud could be vulnerable as well. Hence the medical data requires an efficient encryption mechanism. The encryption of medical data renders it unsearchable.

Consider a scenario in which every medical data item is associated with a set of keywords and hence the search is performed using a keyword. Let us assume that there are n files. We assume that each file is associated with k keywords. Let the total number of keywords be m. In a scenario wherein a file based search is performed, every file is associated with the keywords. In order to retrieve the required files, the keywords match is performed and trapdoors are searched. For the given scenario it would require n×k search operations. Storage mechanism in filed based search is shown in Table 3 below.

TABLE 3

| File 1 | Keyword 1 | ... | Keyword k |
|---|---|---|---|
| File 2 | Keyword 1 | ... | Keyword k |
| File 3 | Keyword 1 | ... | Keyword k |
| File 4 | Keyword 1 | ... | Keyword k |
| File 5 | Keyword 1 | ... | Keyword k |
| . | . | ... | . |
| . | . | ... | . |
| File n | Keyword 1 | ... | Keyword k |

In another scenario wherein a keyword based search is performed, the keywords are arranged and files containing particular keyword are mapped with the keywords. On an average each keyword is mapped with $$\frac{k \cdot n}{m}$$

files. When the user search for a keyword the user performs a match with m different keywords. Once a match is found with the keyword, the search stops and no further search is performed. Storage mechanism in keyword based search is shown in Table 4 below.

TABLE 4

| Keyword 1 | Associated files |
|---|---|
| Keyword 2 | Associated files |
| Keyword 3 | Associated files |
| Keyword 4 | Associated files |
| . | . |
| . | . |
| Keyword m | Associated files |

Consider a case in which the user performs a search for a particular keyword. Let us assume that probability of distribution of the keyword in the list be same. Hence, the probability that the search with first keyword is successful is same as probability the keyword is stored at the last position in the search table. Hence, on an average the number of search operations required to find the keyword. Computation for search operations is shown in Table 5 below.

TABLE 5

| Keyword position | Number of search operations |
|---|---|
| 1 | 1 |
| 2 | 2 |
| 3 | 3 |
| ... | ... |
| m | m |
|  | Sum = 1 + 2 + ... m |

The summation is:

$$S = 1 + 2 + 3 + 4 + \ldots m$$
$$= \frac{m \cdot (m+1)}{2}$$

Hence on an average number of search operations performed are:

$$\frac{s}{m} = \frac{m \cdot (m+1)}{m}$$
$$= \frac{m \cdot (m+1)}{2 \cdot m}$$
$$= \frac{m+1}{2}$$

In a healthcare scenario considering a type of search queries, a patient may search for data that belongs to the patient itself. Generally the patient may perform the search using the patient name or the patient ID as a keyword which will return all the data that belongs to that particular patient.

In this case it will be faster for the patient to retrieve the data since all the required files are associated with the particular keyword the patient desires to search for.

In another scenario, a doctor may search for the data that belongs to a particular department, ex Cardiology or all the cases which the doctor has examined or for a patient's medical data. Hence the 'examining doctor' and the 'department' may be additional keywords. In yet another scenario, a hospital may search for data that is associated with the particular hospital and hence hospital name may act as other keyword. It can be observed here that keywords form only a limited set and hence m<<n. Therefore, the number of search queries in keyword based search will be less than queries in file based search.

$$\frac{m+1}{2} << k \cdot n.$$

In the disclosed method and system every time the user saves a data, the data is associated with a keyword. The data storage and the keyword based search facilitates a multi user environment. The data saved by the doctor is searchable and accessible to the patient and hospital and other similar cases.

Also the problem of eavesdropping to learn search patterns has been eliminated by adding random parameters in data and keyword storage, search and retrieval. For example, In case a doctor searches a particular patient's profile again and some person eavesdrop, the person may be able to make a learning that the particular patient has fallen ill again. The method and system disclosed removes such possibility.

Various embodiments of the present invention provide method and systems for a multi-user searchable encryption system over ordered keywords. The method involves The present description includes the best presently-contemplated method for carrying out the present invention. Various modifications to the embodiment will be readily apparent to those skilled in the art and some features of the present invention may be used without the corresponding use of other features. Accordingly, the present invention is not intended to be limited to the embodiments shown but is to be accorded the widest scope consistent with the principles and features described herein.

As will be appreciated by those ordinary skilled in the art, the aforementioned example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code.

We claim:

1. A multi-user searchable encryption system, the system comprising:
    a key generation server configured to generate system parameters, a primary key, and a secondary key;
    a user terminal configured to receive the primary key, encrypt data to obtain cypher text, encrypt symmetric key to obtain encrypted symmetric key, encrypt keyword to obtain encrypted keyword, generate trapdoor using the primary key for a search keyword inputted by user, and generate a decryption parameter using the primary key;
    a proxy server configured to receive the cypher text, the encrypted keyword, and the encrypted symmetric key from the user terminal, and the secondary key from the key generation server, encrypt trapdoor received from the user terminal using the secondary key, perform a lookup for search results corresponding to the search keyword; and
    a database server configured to store the cypher text at a location address and return the location address of the cypher text to the proxy server;
    wherein the proxy server is further configured to maintain a table of secondary keys, re-encrypt the encrypted symmetric key and encrypted keyword using the secondary key, and maintain a table of re-encrypted symmetric keys.

2. The system of claim 1, wherein data is encrypted using symmetric key to obtain cypher text.

3. The system of claim 1, wherein symmetric key is encrypted using primary key to obtain encrypted symmetric key.

4. The system of claim 1, wherein keyword is encrypted using primary key to obtain encrypted keyword.

5. The system of claim 1, wherein the proxy server is further configured to maintain a table to store location address of data.

6. The system of claim 1, wherein the proxy server is further configured to generate a decryption attribute using the decryption parameter, the secondary key, and the re-encrypted symmetric key.

7. The system of claim 1, wherein the user terminal is further configured to receive a decryption attribute and the cypher text from the proxy server, generate decryption keys using the decryption attribute, the primary key, and the decryption parameter.

8. The system of claim 1, wherein the user terminal is further configured to decrypt the cypher text using the decryption keys and symmetric decryption.

9. A multi-user searchable encryption method, the method comprising:
    generating, at a key generation server, system parameters, a primary key, and a secondary key;
    receiving, at a user terminal, the primary key;
    encrypting, at the user terminal, data to obtain cypher text, symmetric key to obtain encrypted symmetric key, keyword to obtain encrypted keyword;
    generating, at the user terminal, trapdoor using the primary key for a search keyword inputted by user, and a decryption parameter using the primary key;
    receiving, at a proxy server, the cypher text, the encrypted keyword, the encrypted symmetric key, and the secondary key;
    encrypting, at the proxy server, trapdoor using the secondary key;
    performing, at the proxy server, a lookup for search results corresponding to the search keyword; and
    storing, at a database server, the cypher text at a location address and returning the location address of the cypher text to the proxy server;
    wherein the method further comprises at least one selected from the group consisting of (a), (b), and (c):
    (a) re-encrypting, at the proxy server, the encrypted symmetric key and encrypted keyword using the secondary key;

(b) maintaining, at the proxy server, a table of re-encrypted symmetric keys and a table to store location address of data; and (c) receiving, at the user terminal, a decryption attribute and the cypher text.

10. The method of claim 9, wherein data is encrypted using symmetric key to obtain cypher text.

11. The method of claim 9, wherein symmetric key is encrypted using primary key to obtain encrypted symmetric key.

12. The method of claim 9, wherein keyword is encrypted using primary key to obtain encrypted keyword.

13. The method of claim 9, further comprising maintaining, at the proxy server, a table of secondary keys.

14. The method of claim 9, further comprising re-encrypting, at the proxy server, the encrypted symmetric key and encrypted keyword using the secondary key.

15. The method of claim 9, further comprising maintaining, at the proxy server, a table of re-encrypted symmetric keys and a table to store location address of data.

16. The method of claim 9, further comprising receiving, at the user terminal, a decryption attribute and the cypher text.

17. The method of claim 9, further comprising generating, at the user terminal, decryption keys using a decryption attribute, the primary key, and the decryption parameter.

18. The method of claim 9, further comprising decrypting, at the user terminal, the cypher text using the decryption keys and symmetric decryption.

19. A non-transitory computer readable medium having stored thereon instructions for performing a method, which, when executed by at least one processor, cause the processor to perform steps comprising:

generating, at a key generation server, system parameters, a primary key, and a secondary key;

receiving, at a user terminal, the primary key;

encrypting, at the user terminal, data to obtain cypher text, symmetric key to obtain encrypted symmetric key, keyword to obtain encrypted keyword;

generating, at the user terminal, trapdoor using the primary key for a search keyword inputted by user, and a decryption parameter using the primary key;

receiving, at a proxy server, the cypher text, the encrypted keyword, the encrypted symmetric key, and the secondary key;

encrypting, at the proxy server, trapdoor using the secondary key;

performing, at the proxy server, a lookup for search results corresponding to the search keyword; and storing, at a database server, the cypher text at a location address and returning the location address of the cypher text to the proxy server;

wherein the steps further comprise:

re-encrypting, at the proxy server, the encrypted symmetric key and encrypted keyword using the secondary key;

maintaining, at the proxy server, a table of re-encrypted symmetric keys and a table to store location address of data; and receiving, at the user terminal, a decryption attribute and the cypher text.

* * * * *